Aug. 6, 1957     T. WOLF     2,801,670
FRACTIONAL OVERWINDING DEVICE FOR COIL WINDING MACHINES
Filed April 27, 1955     4 Sheets-Sheet 1
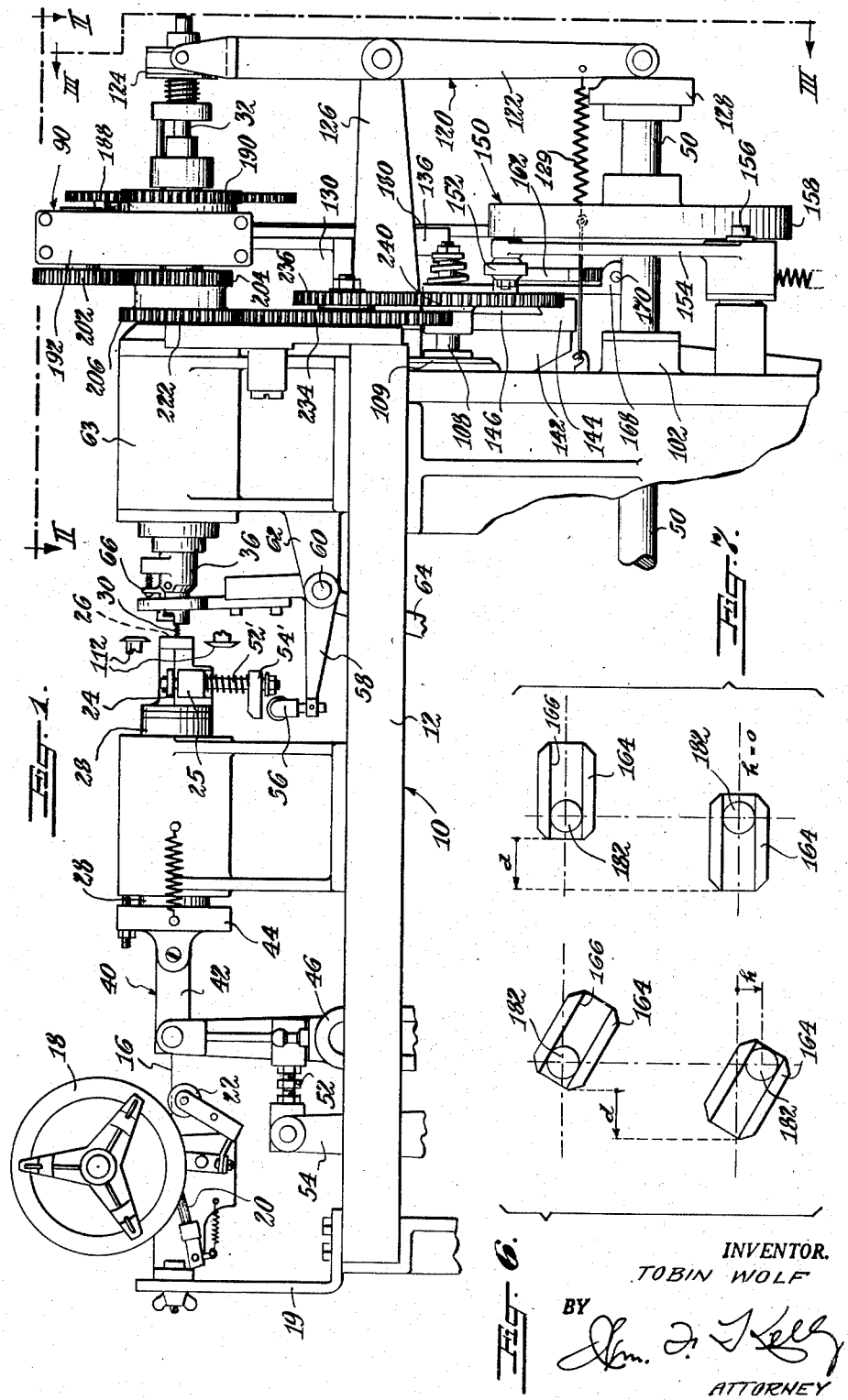
INVENTOR.
TOBIN WOLF
BY
ATTORNEY Aug. 6, 1957 T. WOLF 2,801,670
FRACTIONAL OVERWINDING DEVICE FOR COIL WINDING MACHINES
Filed April 27, 1955 4 Sheets-Sheet 2
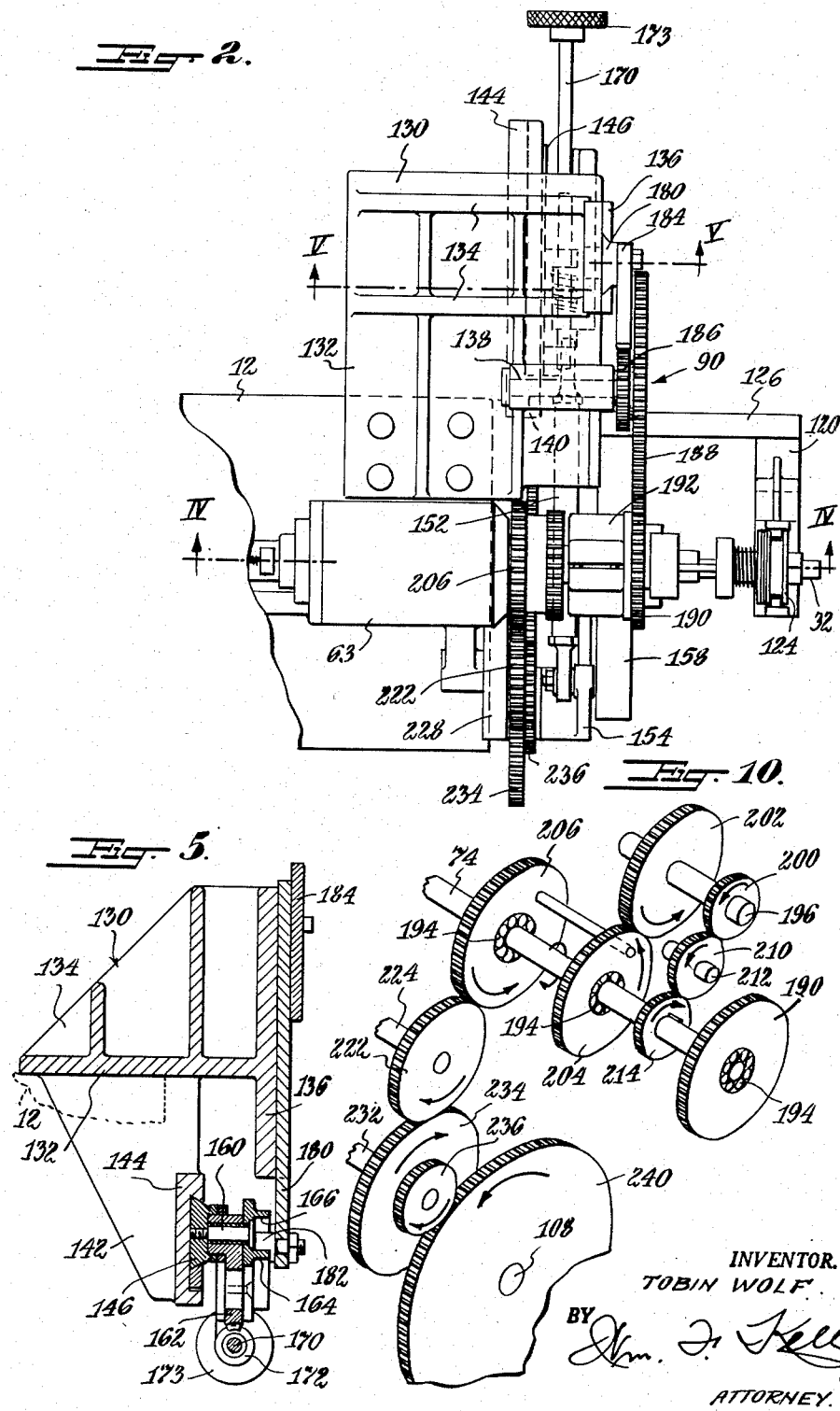
INVENTOR.
TOBIN WOLF
BY
ATTORNEY.

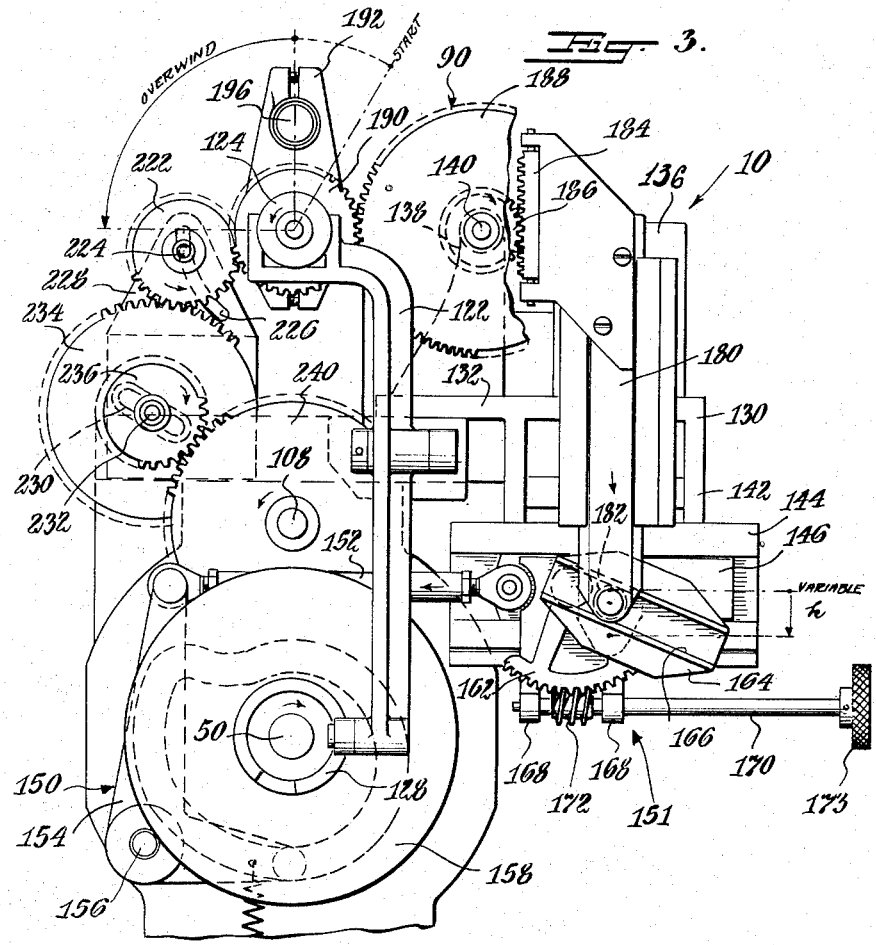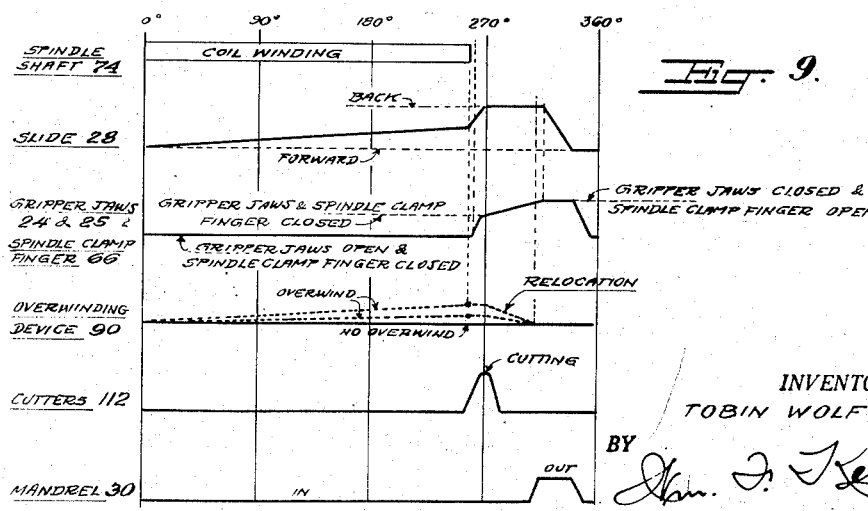

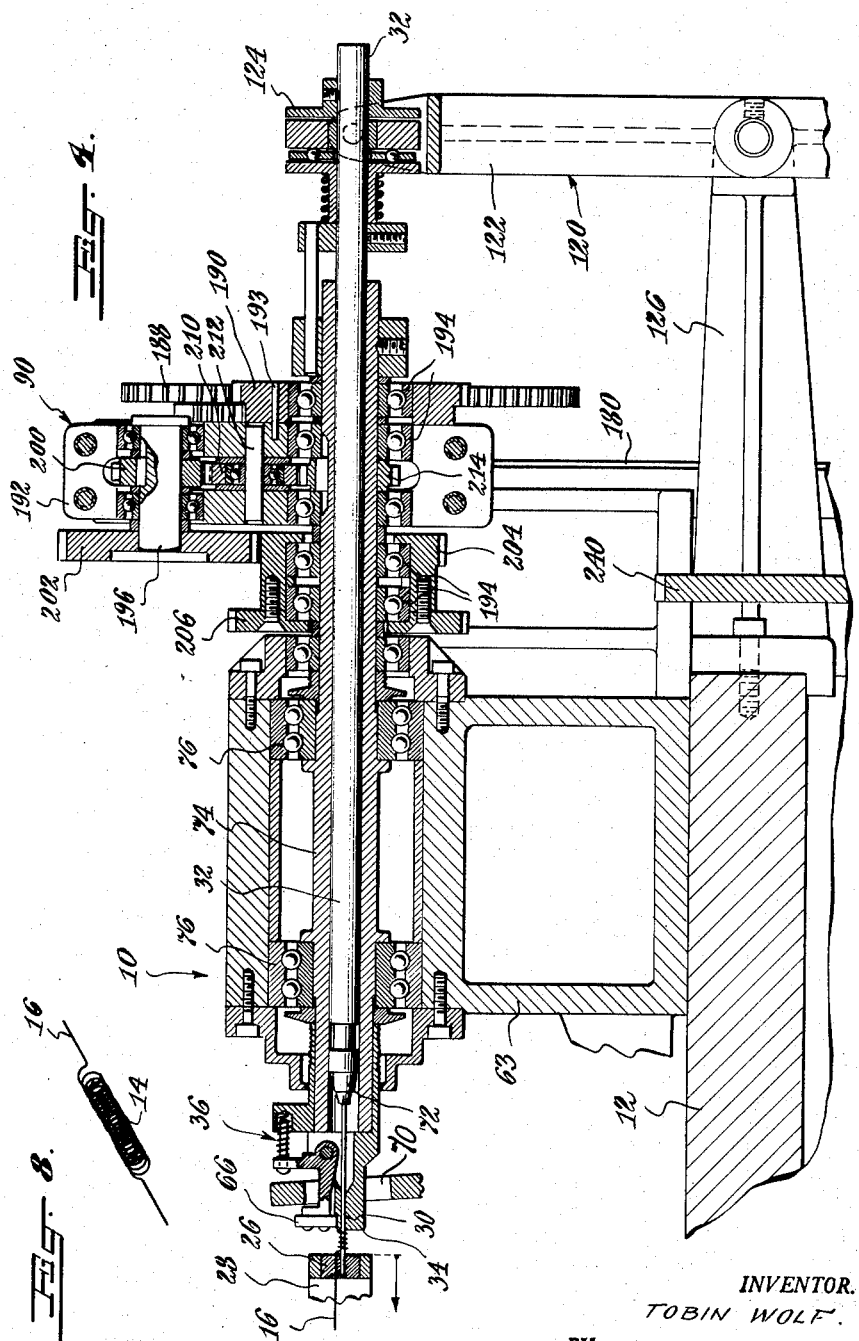

# United States Patent Office 2,801,670
Patented Aug. 6, 1957

2,801,670

FRACTIONAL OVERWINDING DEVICE FOR COIL WINDING MACHINES

Tobin Wolf, Bloomfield, N. J., assignor to Westinghouse Electric Corporation, East Pittsburgh, Pa., a corporation of Pennsylvania Application April 27, 1955, Serial No. 504,196

5 Claims. (Cl. 153—67)

The present invention relates to coil winding machines and, more particularly to a fractional overwinding device for such a machine.

A filamentary coil having its legs ultimately bent at right angles to the longitudinal axis of the coil and in parallel planes requires a fractional additional turn, say for example ¼ turn, to so position the legs in these parallel planes. Conventional coil winding machines usually wind an additional turn and rely on the variable "spring back" of the resilient wire to achieve the desired fractional turn of overwind. The variable wire characteristics render such a practice a matter of chance and not of science.

In the conventional coil winding machine for coiled filaments a change gear train transmits motion from the intermittent drive to the coil winding spindle. During a portion of the coil winding cycle the coil winding spindle and change gears are stationary. During this stationary interval the finished coil is cut and transferred to the leg forming device and the loose end of the filament wire is fed to the wire holding clamp on the coil winding spindle. When the loose end of the wire is clamped, the coil winding machine is ready to wind the next coil.

Since the wire clamping finger on the coil winding spindle must be in the same position at the end of each cycle to receive the loose end of the wire, the coil winding spindle must necessarily stop in the same position at the end of every cycle. The conventional coil winding machine is geared so that the coil winding spindle will make any number of whole revolutions. A fractional turn of overwind is not possible unless some means is provided on the conventional coil winding machine to return the spindle to its "whole-turn" or normal position for receiving a loose end of a filament wire.

Hence, it has been found advantageous according to the invention to provide a fractional overwinding device for coil winding machines which will (1) permit a predetermined fractional amount of overwind and then (2) return the coil winding spindle to its wire receiving or coil winding cycle starting position. The fractional overwinding device of the invention does not alter the standard intermittent drive of the coil winding spindle.

The fractional overwinding device of the invention comprises essentially a housing of a planetary gear system rotatable on the coil winding spindle, a coil winding spindle rotating mechanism for connecting the intermittent drive of the coil winding machine to said coil winding spindle and a housing rotating mechanism for superimposing said housing rotation upon said coil winding rotation.

In its general aspect the present invention has as its objective a fractional overwinding device for a coil winding machine which will permit a predetermined fractional amount of overwinding and then return the coil winding spindle shaft to its wire receiving and cycle starting position.

A specific object of the present invention is a fractional overwinding device for a coil winding machine which does not alter the intermittent drive for a standard coil winding spindle shaft.

A still further object is a housing rotation control mechanism for a housing rotating mechanism and for varying the rotation of said housing.

Other objects of the present invention will become apparent to those skilled in the art to which it appertains as the description thereof proceeds both by direct recitation and implication of the context.

Referring now to the drawings in which like numerals of reference indicate similar parts throughout the several views:

Fig. 1 is a side elevational view of a coil winding machine incorporating the fractional overwinding device of the invention and with the coil leg cutting mechanism and coil transfer arm (not shown).

Fig. 2 is a plan view of the fractional overwinding device of the invention and the associated portions of the coil winding machine of Fig. 1, along the line II—II of Fig. 1 in the direction of the arrows.

Fig. 3 is an end elevational view of the fractional overwinding device and showing the main drive shaft of the coil winding machine, the intermittent drive gear train of the spindle shaft rotating mechanism and the housing rotating mechanism along the lines III—III of Fig. 1 in the direction of the arrows.

Fig. 4 is an enlarged vertical sectional view of the spindle shaft and the fractional overwinding device along the lines IV—IV of Fig. 2 in the direction of the arrows.

Fig. 5 is a vertical sectional view of the housing rotation control mechanism along the line V—V of Fig. 2 in the direction of the arrows.

Fig. 6 is a diagrammatic view showing the amount of the vertical travel of the vertical slide of the housing rotating mechanism of the fractional overwinding device during the horizontal stroke of the sine bar cam when said cam is set for fractional overwinding.

Fig. 7 is a view similar to Fig. 6 but showing the sine bar cam parallel to the horizontal axis of the horizontal slide to eliminate vertical movement of the vertical slide and hence to permit conventional operation of the coil winding machine.

Fig. 8 is a perspective view of a coil produced on the improved coil winding machine of the invention.

Fig. 9 is a graphical illustration showing the sequential operation of the fractional overwinding device, spindle shaft, slide, wire feed gripper jaws, spindle clamp finger, cutters and mandrel.

Fig. 10 is a perspective schematic view of the coil winding spindle shaft and the related gearing of the fractional overwinding device.

Referring now to the drawings and particularly to Figs. 1 and 4, the reference numeral 10 designates a coil winding machine having a frame 12. The coil winding machine 10 may be employed to coil a single coil filament 14 (Fig. 8) from refractory filament wire 16. The filament wire 16 may be coiled on a wire spool 18 (Fig. 1) which is carried by a bracket 19 upstanding from the frame 12 of the machine 10. The wire 16 may be cleaned by a spring biased brush 20 and fed over a guide roller 22 and drawn between wire gripper jaws 24 and 25 and through a coiling die 26 in the nose of a wire feed gripper slide 28. A mandrel 30 on which the filament wire 16 is to be coiled is held by a suitable chuck in a spindle 32 and extends through a nose 34 of a coiling head 36 adjacent to the coiling die 26 on the wire feed gripper slide 28.

This wire feed gripper slide 28 (Figs. 1 and 4) is resiliently reciprocable in a guide upstanding from the frame 12 of the machine 10 by means of a reciprocating mechanism 40. This mechanism 40 comprises a link 42 for connecting a yoke 44 on the slide 28 to an adjustable connecting rod 46 which is connected by conventional linkage (not shown) to a turns per inch cam (not shown) on a continuously rotating main drive shaft 50 of the coil winding machine 10. A link 52 connects the first connecting rod 46 to a second connecting rod 54. This connecting rod 54 is joined by conventional linkage (not shown) to a coil leg pulling cam (not shown) on the main drive shaft 50. It will be understood that the turns per inch mechanism and coil leg pulling mechanism are tied together and that the former is slower and more continuous in its motion than the latter.

At the start of the cycle of operation of the coil winding machine 10, a loose end of the filament wire 16 extends a definite distance beyond the coiling die 26 in the slide 28. The wire gripper slide 28 advances toward the mandrel 30 until this loose end of the filament wire 16 is carried through a V-shaped notch and over a plane surface on the nose 34 of the coiling head 36. During this movement the wire gripper jaws 24 and 25 are closed so that the filament wire 16 is pulled from the spool 18. The mandrel 30 passes into an aperture in the coiling die 26 adjacent the aperture for feeding the filament wire 16.

The upper wire gripping jaw 24 (Figs. 1 and 4) is fastened to a portion of the slide 28, whereas the lower jaw 25 is movable and is mounted on the end of a pin 52' depending from the upper fixed jaw 24 and rests on a suitable spring. A block 54' is also fastened to the pin 52' and is engageable by a roller mounted on a yoke 56 on one end of a substantially horizontally disposed U-shaped arm 58. This arm 58 is pivoted at its open end on a rod 60 carried by a bracket 62 projecting from a pedestal 63. An operating arm 64 (Fig. 1) affixed to the rod 60 is connected by conventional linkage (not shown) to a wire gripper cam (not shown) on the continuously rotating drive shaft 50 of the coil winding machine 10. Clockwise rotation of the operating arm 64, as viewed in Fig. 1, moves the block 54 and hence the lower movable jaw 25 upwardly to secure the wire 16 between the jaw 25 and the stationary upper jaw 24.

When the wire gripper slide 28 (Figs. 1 and 4) advances forwardly and passes the loose end of the filament wire 16 over the nose 34 of the coiling head 36, a spring-biased clamping finger 66 pivoted on the nose 34 is lowered so that the loose end of the filament wire 16 is gripped between the clamping finger 66 and a plane block-like surface on the nose 34. It will be understood that the spring-biased finger 66 is located in a slot in the coiling head 36 and pivots on a suitable pin outstanding from coiling head 36. The clamping finger 66 is moved downwardly into the normally closed position by a spring and moved upwardly to the release position by an overhanging release arm 70 (Fig. 4) which is fastened to the rod 60. Counterclockwise rotation when viewed in Fig. 1 of the operating arm 64 and the clamping arm 70 permits the clamping finger 66 to engage the loose end of the filament wire 16 between the finger 66 and the plane surface on the nose 34. Simultaneously, this counterclockwise rotation of the operating arm 64 allows the spring-biased jaw 25 of the wire gripper head 28 to open which permits the backward retraction of the slide 28 during the coiling of a filament coil 14.

The coiling of the filament wire 16 about the mandrel 30 consists of rotating the mandrel 30 and the nose 34 of the coiling head 36 (with the loose end of the filament wire 16 held therein) to wind the filament wire 16 about the mandrel 30 and the slow withdrawal of the wire gripper slide 28 away from the coiling head 36 to space the turns of the finished filament coil 14 thereby providing the desired turns per inch in the coil 14. As shown in Figs. 1 and 4 the mandrel 30 is held by a chuck 72 located in the coil winding end of the spindle 32. The spindle 32 is reciprocable within a hollow spindle shaft 74 for supporting the nose 34 of the coiling head 36. The hollow shaft 74 is rotatable on ballbearings 76 of the coiling head standard 63 (together with the spindle 32 by means of collars and a pin as shown in the right hand end of Fig. 4) by a spindle shaft rotating mechanism of a fractional overwinding device 90 of the invention as hereinafter explained. This fractional overwinding device 90 of the invention also has a housing rotating mechanism.

The continuously rotating main drive shaft 50 of the coil winding machine 10 is suitably journalled in a plurality of bearings 102, only one of which is shown in Fig. 1, carried by the frame 12 of the coil winding machine 10. The shaft 50 carries an intermittent drive gear (not shown) which does not have teeth completely around the periphery thereof. A pinion gear (as shown in Fig. 5 of U. S. Patent No. 2,179,296 entitled "Filament Coiling Machine" and assigned to General Electric Company) on an intermittent drive or stub shaft 108 (Figs. 1, 10) engages the intermittent gear (not shown) and rotates only when teeth of the pinion gear (not shown) engage the toothed portion of the intermittent drive gear (not shown). The shaft 108 is journalled in a suitable bearing 109 in the frame 12 of the coiling machine 10.

The retracting movement of the wire gripper slide 28, as hereinbefore mentioned, spaces the turns of the filament wire 16 in the finished coil 14. The timing of the operations of the coil winding machine 10 is such that the required number of turns of the filament wire 16 have been coiled about the mandrel 30 when the rotation of the coiling head 36 is stopped. As the end of the movement of the wire gripper slide 28 is reached, cutters or knives 112 (Fig. 1 and Fig. 5 of U. S. Patent No. 2,179,296 mentioned above) move together to sever the straight portion of the filament wire 16 (extending beyond the mandrel 30) in the middle so that a straight leg remains on the coiled portion of the filament wire 16 and the desired filament 14 is formed. Following the severing of the filament leg, the clamping finger 66 is raised (as hereinbefore explained) so that both ends of the filament 14 are free. A certain amount of spring-back will occur within the filament 14 to loosen it on the mandrel 30. The mandrel 30 is then retracted into the coiling head 36 permitting the unsupported filament 14 to fall from the coiling machine 10 into a receptacle (not shown) or to be picked up by a conventional filament transfer device (not shown).

The spindle 32 which carries the mandrel 30 is reciprocable within the hollow shaft 72 by means of a spindle retracting mechanism 120 (Figs. 1 and 3). This spindle retracting mechanism 120 has a lever 122 which engages a grooved collar 124 on the end of the spindle 32. The lever 122 is pivoted on a bracket 126 outstanding from the frame 12 of the coil winding machine 10 and is actuated by a mandrel stripper or spindle retracting cam 128 on the main drive shaft 50 of the coil winding machine 10. The lever 122 is suitably biased by a spring 129 so that a roller carried on the lower end of the lever 122 is held in continuing engagement with the cam 128.

*Fractional overwinding device 90*

The fractional overwinding device 90 (Figs. 1 to 10) of the invention has a casting 130 mounted by means of a flat horizontal portion 132, as viewed in Fig. 5 thereof to the frame 12 of the machine 10, as by bolts. As shown particularly in Fig. 2, the casting 130 has a pair of ribs 134 upstanding from the flat horizontal plate-like portion 132. These ribs 134 carry a vertical rackbar slide guide 136 in their righthand end (when viewed in Fig. 2). The casting 130 is also provided with a gear shaft pedestal 138 for journalling therein a gear shaft 140 for use as hereinafter explained. It will be understood that the pedestal 138, when viewed in Fig. 2, is suitably located on the flat plate 132 parallel to the ribs 134.

The casting 130 has a pair of downwardly depending ribs 142 which carry near their lower righthand end (when viewed in Fig. 5) an overwinding operating slide guide 144. A horizontal overwinding operating slide 146 (Fig. 3) is horizontally reciprocable in the guide 144 by means of a fractional overwinding device operating mechanism 150 of the housing rotating mechanism. The housing rotating mechanism is also provided with a housing rotating control mechanism 151.

*Fractional overwinding device operating mechanism*

The horizontal operating slide 146 (Figs. 1, 2 and 3) is connected by a link 152 to the upper arm of a bell crank lever 154 on a suitable lever shaft 156. The lower arm of the bell crank lever 154 carries a roller in engagement with a box-type fractional overwinding device operating cam 158 on the main drive shaft 50.

*Housing rotation control mechanism*

The horizontal operating slide 146 (Fig. 5) is provided with a stub shaft 160 on which is fixed a gear segment 162 and a slotted sine-bar cam 164 (Figs. 3, 5 and 6) which cam 164 is provided with a rack bar slide roller slot 166. The horizontal slide 146 carries a pair of depending lugs 168 (Fig. 3) for journalling therein an adjustment shaft 170 provided with a worm 172 secured thereon between the lugs 168 for engagement with the gear segment 162 and a knob 173. By turning the adjustment shaft 170 in a clockwise direction (when viewed in Fig. 3) the segment 162 is moved in a clockwise direction along with the sine bar cam 164, thus varying (i. e. increasing) the vertical height "h" (Figs. 3 and 6) of the slot 166 in the sine bar cam 164. The horizontal travel "d" (Fig. 6) of the operating slide 146 is fixed and is determined by the throw of the operating cam 158.

*Housing rotating mechanism*

As shown in Figs. 3 and 5, a rack slide bar 180 is vertically reciprocable in the vertical slide guide 136 of the casting 130. This rack bar 180 carries a roller 182 on its lower end which rides in the rack bar roller slot 166 in the sine bar cam 164. The bar 180 carries a rack 184 on its upper end which is in engagement with a pinion gear 186 fixed to the gear shaft 140, journalled in the pedestal 138 of the casting 130. The shaft 140 also carries a suitable larger gear 188 in engagement with a housing drive gear 190 affixed to the housing 192, as by a pin 193 (Fig. 4).

The housing 192 and the drive gear 190 rotate together on suitable ballbearings 194 on the spindle shaft 74 which in turn is rotatable by both the housing rotating mechanism and the spindle shaft rotating mechanism. This gear 190 also prevents rotation of the housing 192 when the fractional overwinding device 90 of the invention is not in use during coil winding.

It will be understood from the above description that the housing rotating mechanism comprises the fractional overwinding device operating mechanism 150, the operating slide 146 horizontally reciprocable in the body 130, the variable angle sine bar cam 164 carried by the slide 146, the rack bar slide 180 which is vertically reciprocable in the body 130 and is in sliding roller engagement with said sine bar cam 164, a pair of transfer gears 186 and 188 rotatable on the shaft 140 journalled in the body 130 and a housing drive gear 190 on the housing 192. Pinion gear 186 engages rack 184 on the slide bar 180. Gear 188 engages housing drive gear 190.

To add a fractional turn to the coil 14, the drive gear 190 and the housing 192 must rotate counterclockwise, as shown in Fig. 3 (if the spindle shaft 74 rotates counterclockwise), and the rack gear 186 must rotate clockwise. The rack 184 and hence the rack bar slide 180 must go down during coiling.

During relocation of the housing 192 by the cam 158, the rack bar slide 180 goes up; the rack gear 186 turns counterclockwise; and the drive gear 190 and the housing 192 rotate clockwise.

*Spindle shaft rotating mechanism*

The housing 192 (Figs. 2, 3 and 4) carries an upper planetary gear train drive shaft 196 of an epicyclic or planetary gear train journalled therein on suitable ballbearings. This upper planetary gear shaft 196 carries secured thereon an upper planetary train drive gear 200 (Figs. 1 and 4) within the housing 192 and an outer epicyclic follower gear 202 secured to the shaft 196 outside the housing 192. This epicyclic follower gear 202, suitably "micarta", engages a fixed gear 204 of the epicyclic train. Gears 204 and 206 (suitably held together as shown in Figs. 4 and 10) are rotatable on suitable ballbearings 194 on the coil winding spindle shaft 74.

The upper planetary gear train drive gear 200 engages an idler gear 210 on an idler shaft 212 journalled in suitable ball bearings within the planetary housing 192. This idler gear 210 also engages a spindle shaft drive gear 214 which is suitably keyed or pinned to the spindle shaft 74, as shown in Figs. 4 and 10.

Assume for example, that the number of teeth on the gear members 204, 202, 200, 210 and 214 (Fig. 10) are as follows: 204—40 teeth; 202—40 teeth; 200—20 teeth; 210—20 teeth; 214—20 teeth. The train value equals:

$$-\frac{N_{214} \times N_{202}}{N_{200} N_{204}} \text{ or } -\frac{40 \times 20}{40 \times 20} \text{ or } -1$$

The minus value is employed because gears 204 and 214 rotate in opposite directions. The epicyclic value equals 1—(train value) or 1—(—1) or 2.

This means that every time the housing 192 is rotated counterclockwise X°, as viewed in Fig. 3, and the fixed gear 204 of the epicyclic remains fixed, the drive gear 214 and hence the spindle shaft 74 rotates 2X°. Thus if the housing 192 is rotated 90° counterclockwise by the housing rotating mechanism, the spindle shaft 74 will be rotated 180° in counterclockwise direction.

*Intermittent drive gear train*

The gear 206 engages an intermittent drive gear train. This intermittent drive gear train (Figs. 1, 3 and 10) comprises a reversing gear 222 located on a stud shaft 224 which is adjustably mounted in an arcuate slot 226 provided in a mounting bracket or plate 228 upstanding from the frame 12 of the coil winding machine 10.

This bracket 228 is provided with a lower shaft arcuate adjustment slot 230 in which is adjustably mounted a stud shaft 232. The shaft 232 carries a pair of gears 234 and 236. The larger gear 234 (Fig. 10) engages the reversing gear 222. The smaller gear 236 engages an intermediate intermittent drive driven gear 240 on the intermittent drive shaft 108 (Fig. 1) of the coil winding machine 10. As hereinbefore mentioned the intermittent drive shaft 108 is connected to the continuously driven drive shaft 50 by a pinion gear (not shown) on the intermittent drive shaft 108 and the intermittent drive gear (not shown) on the main drive shaft 50.

*Operation on the spindle shaft rotating mechanism*

Assuming that the intermittent drive shaft 108 and the intermediate intermittent drive driven gear 240 rotate in a counterclockwise direction, the gears 234 and 236 (Fig. 10) on the shaft 232 rotate in a clockwise direction. The reversing gear 222 on the stud shaft 214 rotates in a counterclockwise direction and turns the gears 204 and 206 (rotatable on the spindle shaft 74) in a clockwise direction. Hence, the follower gear 202 and the upper planetary drive gear 200 on the upper planetary gear train drive shaft 106 rotate in a counterclockwise direction. Consequently, the idler gear 210 rotates in a clockwise direction, thus finally rotating the drive gear 214 and the spindle shaft 74 in a counterclockwise direction during the coiling of the predetermined number of turns in the coil 14.

*General operation*

As shown in Fig. 9 the spindle shaft 74 and hence the spindle 32 begin rotating at the start of the operational cycle of the coil winding machine 10 (i. e. the start of the rotation of the main cam shaft 50 of the coil winding machine 10). The wire gripper slide 28 is in its forward most position, as viewed in Fig. 1, contiguous to the coiling head 36. The wire feed gripper jaws 24 and 25 on the slide 28 are open and the spindle clamp finger 66 carried on the nose 34 of the coiling head 36 is closed. The mandrel 30 is in its normally "in" position (i. e. in an aperture in the coiling die 26) ready to receive the filament wire 16 to be coiled thereabout.

For approximately 257° (Fig. 9) of counterclockwise rotation, as viewed in Fig. 1, of the main cam shaft 50, the spindle shaft 74 rotates in the same direction and winds the desired predetermined number of turns in the coil 14. The fractional overwinding device 90 of the invention simultaneously uniformly superimposes a desired fractional overwind turn on the predetermined number of turns. The slide 28 (with the jaws 24 and 25 open) retracts slowly away from the coiling head 36, approximately ½ the distance between its starting or forward position and its normally back or retracted position.

After the completion of the coil winding operation the slide 28 quickly retracts the remaining leg pulling distance to its normally back or retracted position at about 264° (Fig. 9). These wire feed gripper jaws 24 and 25 as shown in Fig. 9, close about the extended filament leg of the coil 14 (at about 266°), just after the slide 28 reaches its normally back or retracted position.

Meanwhile, simultaneously with the cessation of the coil winding operation, the cutters 112 (Fig. 1) have started to close about the extended leg of the coil 14 held in the wire feed gripper jaws 24 and 25. The cutting of the extended leg of the coil 14 occurs at about 269° (Fig. 9). The cutters start to open at about 273° and open wide at about 282° of the rotation of the main cam shaft 50. From about 270° to 310° of rotation of the main cam shaft 50, the overwinding device 90 is relocated by the cam 158 to its starting or loose wire end receiving position. Meanwhile between about 266° and 340° of rotation of the main cam shaft 50 the wire feed gripper jaws 24 and 25 remain closed. From about 306° to 312° of rotation of the main cam shaft 50 the mandrel 30 is retracted within the spindle 32. The spindle clamp finger 66 begins to open at about 266° and finally opens at about 314° thus releasing the now cut coil 14 from the coiling head 36.

During about 316° to 340° (Fig. 9) of rotation of the main cam shaft 50 the slide 28 returns to its normally forward position. The now open spindle clamp finger 66 and the now closed wire feed gripper jaws 24 and 25 return to the starting position, wherein the spindle clamp finger 66 is closed at about 347° and the wire feed gripper jaws 24 and 25 are open at about 354° respectively. The mandrel 30 is in the forward position at 350°, ready to commence coil winding at 360°.

Although a preferred embodiment of the invention has been disclosed it will be understood that modifications may be made within the spirit and scope of the invention.

I claim:

1. In combination for a coil winding machine: a spindle shaft for a coil winding head, a first rotating means operatively connected to said shaft and adapted to rotate said shaft, a housing rotatable on said shaft, said first rotating means having a planetary gear system in said housing, said gear system being adapted to rotate said shaft with said housing, a second rotating means operatively connected to said housing and adapted to rotate said housing to superimpose the rotation of said housing on the rotation of said shaft.

2. In combination for a coil winding machine: a spindle shaft for a coil winding head, a first rotating means operatively connected to said shaft and adapted to rotate said shaft, a housing rotatable on said shaft, said first rotating means having a planetary gear system in said housing, said gear system being adapted to rotate said shaft with said housing, a second rotating means operatively connected to said housing and adapted to rotate said housing to superimpose the rotation of said housing on the rotation of said shaft and control means for varying the rotation of said housing.

3. In combination for a coil winding machine: a spindle shaft for a coil winding head, a first rotating means operatively connected to said shaft and adapted to rotate said shaft, a housing rotatable on said shaft, said first rotating means having a planetary gear system in said housing, said gear system being adapted to rotate said shaft with said housing, a second rotating means operatively connected to said housing and adapted to rotate said housing a fraction of a revolution to superimpose the fractional rotation of said housing on the rotation of said shaft and control means for varying the fractional rotation of said housing.

4. In combination for a coil winding machine: a spindle shaft for a coil winding head, a first rotating means operatively connected to said shaft and adapted to rotate said shaft in a desired direction, a housing rotatable on said shaft, said first rotating means having a planetary gear system in said housing, said gear system being adapted to rotate said shaft with said housing, a second rotating means operatively connected to said housing and adapted to rotate said housing a fraction of a revolution to add said fraction of a revolution to the rotation of said shaft and control means for varying the fractional rotation of said housing.

5. In combination for a coil winding machine: a spindle shaft for a coil winding head, a first rotating means operatively connected to said shaft and adapted to rotate said shaft in a desired direction, a housing rotatable on said shaft, said first rotating means having a planetary gear system in said housing, said gear system being adapted to rotate said shaft with said housing, a second rotating means operatively connected to said housing and adapted to rotate said housing a fraction of a revolution in a direction opposite to said desired direction to subtract said fraction of a revolution from the rotation of said shaft and control means for varying the fractional rotation of said housing.

References Cited in the file of this patent

UNITED STATES PATENTS

| | | |
|---|---|---|
| 1,673,185 | Des Combes | June 12, 1928 |
| 1,849,705 | Burd | Mar. 15, 1932 |
| 2,439,893 | Iden | Apr. 20, 1948 |
| 2,445,109 | Ferguson | July 13, 1948 |
| 2,697,470 | Sampatacos | Dec. 21, 1954 |

FOREIGN PATENTS

| | | |
|---|---|---|
| 844,891 | France | May 1, 1939 |